W. A. TURBAYNE.
SYSTEM OF ELECTRICAL REGULATION.
APPLICATION FILED APR. 7, 1913. RENEWED JULY 31, 1919.
1,335,141.
Patented Mar. 30, 1920.
2 SHEETS—SHEET 1.
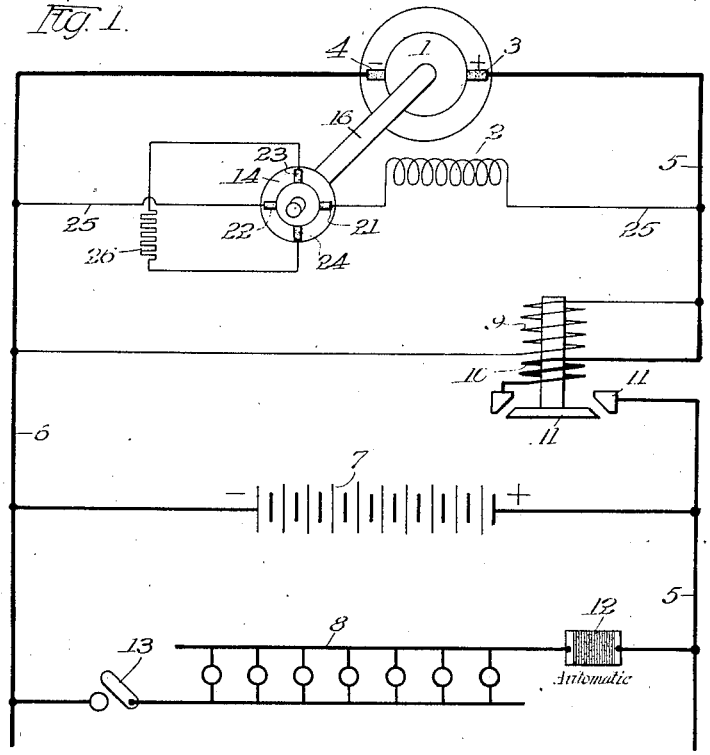
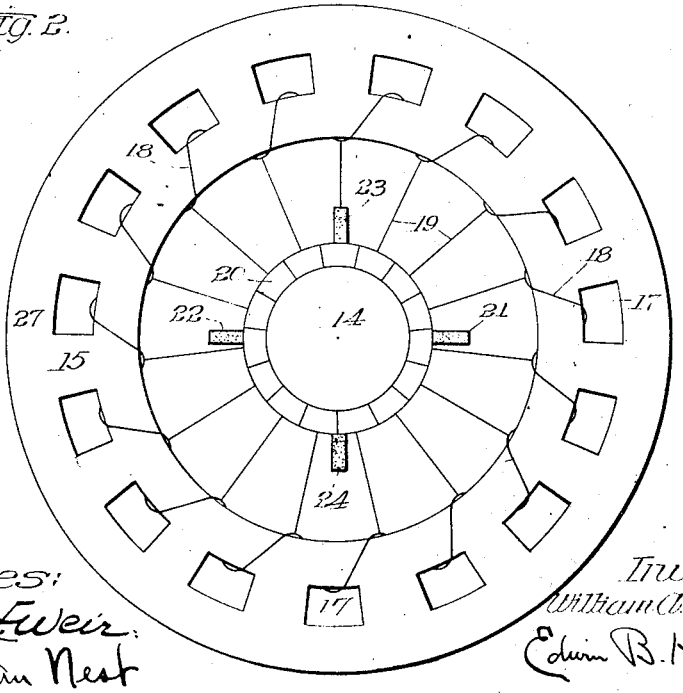

W. A. TURBAYNE.
SYSTEM OF ELECTRICAL REGULATION.
APPLICATION FILED APR. 7, 1913. RENEWED JULY 31, 1919.
1,335,141.
Patented Mar. 30, 1920.
2 SHEETS—SHEET 2.
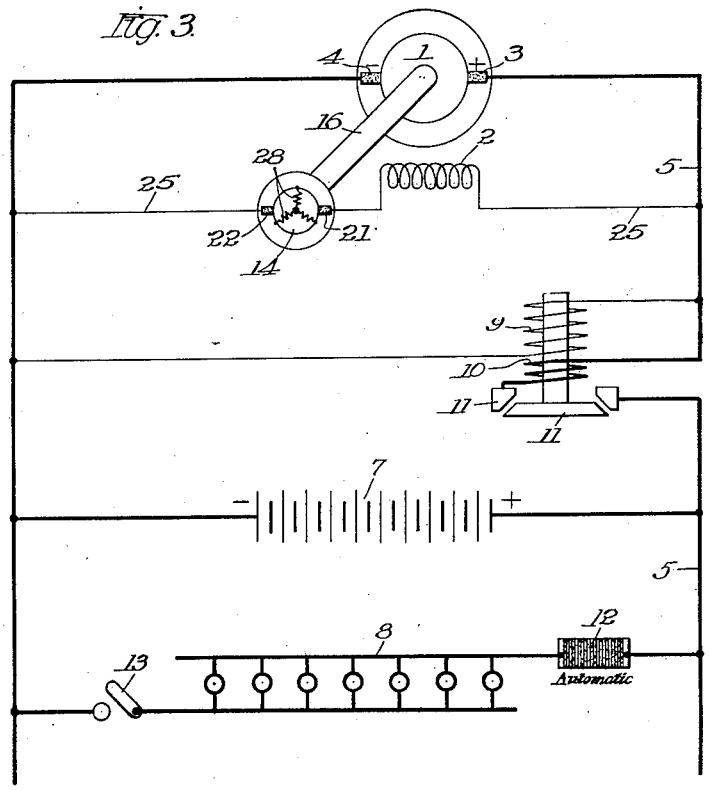
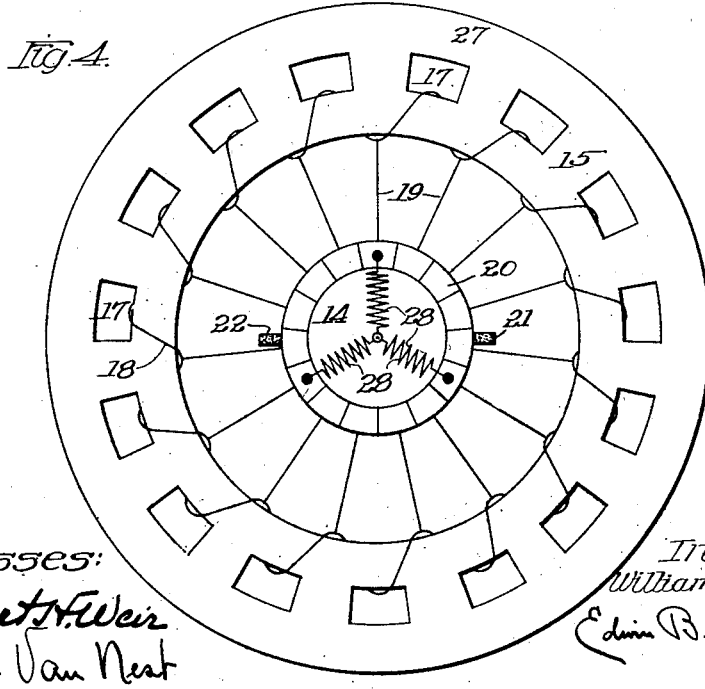
Witnesses:
Robert H. Weir
R. H. Van Nest
Inventor:
William A. Turbayne
Edwin B. H. Tower Jr.
Atty

ER
UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

SYSTEM OF ELECTRICAL REGULATION.

1,335,141.  Specification of Letters Patent.  Patented Mar. 30, 1920.

Application filed April 7, 1913, Serial No. 759,433. Renewed July 31, 1919. Serial No. 314,428.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Regulation, of which the following is a full, clear, concise, and exact description, reference being had to the accompanying drawing, forming a part of this specification.

This invention relates to an improved system of electrical regulation.

In applicant's co-pending application, Serial No. 621,597, filed April 17, 1911, patented September 5, 1916, No. 1,197,159, there is disclosed a system of electrical regulation in which the output from a variable speed generator is regulated by means of a C. E. M. F. device of novel construction, in which the value of the C. E. M. F. developed is determined by an auxiliary regulator.

The present application relates to an improved system in which the value of the C. E. M. F. is determined inherently without recourse to an auxiliary regulator.

An object of the invention is to provide an improved regulating system for a variable speed generator, whereby the generator voltage may be maintained substantially constant.

Another object is to provide an improved regulating system which is unaffected by opening of the external circuit.

Another object is to provide an improved regulating system for regulating the variable speed generators used in car lighting systems so that current of proper characteristics may be supplied to charge the storage battery and to automatically supply a variable load.

Another object is to provide an improved C. E. M. F. machine for regulating the field strength of a variable speed generator.

These, and other, objects may be attained by the preferred embodiments of the invention illustrated in the accompanying drawings, in which:

Figure 1 illustrates diagrammatically a car lighting system to which the improved system of regulation has been applied.

Fig. 2 illustrates diagrammatically one form of C. E. M. F. device which may be employed in such a system.

Fig. 3 illustrates diagrammatically a system similar to that illustrated in Fig. 1, in which a modified form of regulator is employed.

Fig. 4 illustrates diagrammatically the modified form of C. E. M. F. device employed in Fig. 3.

Fig. 1 illustrates a main variable speed generator provided with an armature 1 and a shunt field 2. Brushes 3 and 4 supply current through generator leads 5 and 6 to a storage battery 7 and lamps or other translating devices 8 connected in parallel branches across the main leads. An automatic switch of any preferred type is preferably arranged in one generator lead to control the connection and disconnection of the generator and the load. This switch is provided with a lifting coil 9 connected in shunt across the main leads and series coil 10, these coils controlling contacts 11 in one generator lead. An automatic or any preferred type of lamp regulator 12 may be provided to regulate the voltage on the lamp circuit. The drawing diagrammatically illustrates an automatic lamp regulator of the compressible rheostat type, although, of course, any other type may be substituted. A lamp switch 13 controls the lamp circuit.

The generator regulator comprises a C. E. M. F. device 14. This C. E. M. F. device, as illustrated in Figs. 1 and 2, comprises a cylinder 15, preferably laminated and constructed of iron or other material of high permeability. The cylinder 15 is mounted for rotation with the armature shaft 16 of the main generator. The cylinder is provided with channels 17 for the accommodation of a distributed winding 18. Taps 19 at regular intervals connect this winding to the segments of a commutator 20. Two pairs of brushes 21—22 and 23—24, spaced ninety electrical degrees apart, bear on the commutator. The brushes 21—22 are connected in series in the circuit 25 for the shunt field 2 of the generator. Brushes 23—24 are connected in local circuit through a resistance 26.

The outer portion 27 of the cylinder 15 surrounding the channels 17 serves simply as a path for flux set up in the inner portion surrounded by the windings. The portion 27 may, therefore, be formed separate from the rest of the cylinder and need not rotate with the cylinder. By the integral construction, however, the air gap is eliminated and the reluctance of the magnetic circuit consequently reduced.

Upon rotation of the main generator armature, current will flow from the positive brush 3, through lead 5 and conductor 25 to energize the shunt field 2. This field current will flow through brushes 21—22 of the C. E. M. F. machine, energizing the winding 18 and setting up a flux having its symmetry axis in line with the brushes 21—22. This will develop a negligible voltage across these brushes but will develop a voltage proportionate to the current flowing in the field circuit across the brushes 23—24. Since these brushes are electrically connected through the resistance 26 a current will flow through this local circuit and through the windings of the C. E. M. F. device which will set up a flux in line with the brushes 23—24. The flux will, in turn, develop a voltage across brushes 21—22 in a direction to oppose the initial flow of current. Thus, as the generator speed varies and, consequently, the voltage which the generator impresses across the field circuit tends to vary, the C. E. M. F. developed across brushes 21—22 will vary to maintain the generator voltage substantially constant.

The excitation characteristic of a variable speed generator operating at a constant load in amperes and volts is such that, at low speed, a small increase in speed requires a decided decrease in excitation, while at higher speed very small changes in magnetization are sufficient. To obtain a constant voltage, therefore, from the main generator the C. E. M. F. machine, if opposed to the main generator voltage will have to have a voltage characteristic which will vary substantially inversely as the excitation characteristic of the main generator. Such a characteristic may be readily obtained by various well known means such as a proper selection of the section of iron forming the magnetic circuits of the two machines and by a suitable determination of the value of the resistance 26.

A somewhat similar construction is illustrated in Figs. 3 and 4 in which a C. E. M. F. machine with only a single pair of brushes is provided. The purpose of the C. E. M. F. machine is to develop an effective E. M. F. across the brushes of the C. E. M. F. device in opposition to the current in the generator field circuit. This is accomplished by setting up a flux in quadrature with the brushes connected in the field circuit. This may be accomplished by the arrangement shown in Figs. 3 and 4. In the C. E. M. F. device illustrated in these figures the brushes 23—24 are dispensed with and the winding on the C. E. M. F. device is internally cross-connected through a resistance medium 28, preferably at three points, arranged symmetrically one hundred and twenty degrees apart.

Current flowing through the winding 18 by way of brushes 21—22 will cause an alternating current to flow through the internal connections and the resistance element 28. This current will set up a magnetic flux having its symmetry axis at right angles to the brushes 21—22 with the result that a C. E. M. F. will be developed across these brushes which will regulate the field excitation as explained in connection with Figs. 1 and 2.

When this system is employed in connection with a car lighting generator a pole changer will be necessary in order to maintain the polarity of the main generator terminals constant regardless of changes in direction of rotation. The C. E. M. F. device, however, will not require a pole changer inasmuch as the voltage developed across the brushes 21—22 will always be in opposition to the voltage impressed across the same and will, therefore, regulate the field current regardless of the direction of rotation.

Should the external circuit accidentally become opened the generator voltage in this system cannot rise to an abnormal value as this would presuppose a decided increase of current through the shunt field circuit of the generator. This tendency to rise, however, would be immediately checked by the increased C. E. M. F. which would instantly be developed across the brushes 21—22.

A C. E. M. F. machine of this type may be so adjusted that when opposed to a constant voltage source it will permit only a current of definite value to flow through the brushes 21—22 at a certain definite speed regardless of load conditions on the external circuit of the system. With such a system, therefore, as the battery back E. M. F. rises during charging, the charging current will automatically become reduced in value. At the same time a decrease in voltage across the system, due to the addition of the lamp load, will automatically decrease the effective C. E. M. F. of the regulator, thus permitting the generator to carry the lamp load, and, at the same time, continue to charge the battery. In the event of the battery circuit becoming opened the increased voltage across the system will cause the regulator to immediately respond so that the generator voltage will not rise appreciably above the normal value maintained on closed circuit.

The regulating systems and the improved types of C. E. M. F. machine herein described and illustrated are, of course, for the purposes of illustration only as it is apparent that various modifications in the regulating machine itself or in the manner in which it is connected in circuit may be made which will fall within the scope of the invention as defined in the appended claims.

The improved C. E. M. F. machine is separately claimed in a divisional application, Serial No. 214,588, filed January 31, 1918.

What I claim as new and desire to secure by Letters Patent of the United States is:

1. A system of electrical distribution comprising a variable speed generator provided with a shunt field, and means whereby current in said shunt field circuit is effective to develop an E. M. F. in said circuit opposed to the E. M. F. impressed on said circuit and effective to weaken the current in said shunt field.

2. A system of electrical distribution comprising a variable speed generator provided with a shunt field, a rotatable winding connected in circuit with said shunt field, and means whereby the field current impressed on said winding is effective to develop an E. M. F. in said shunt field circuit opposed to the E. M. F. impressed on said circuit and effective to weaken the current in said shunt field.

3. A system of electrical distribution comprising a variable speed generator provided with a shunt field, a rotatable winding connected in series with said shunt field, and means for connecting portions of said winding together through a resistance whereby current in said shunt field circuit flowing through said winding may develop an E. M. F. opposed to the E. M. F. impressed by said generator on said shunt field circuit.

4. In a system of electrical distribution, a generator provided with a shunt field circuit, a rotatable winding, stationary brushes connecting said rotatable winding in series in the field circuit, and means for connecting portions of said winding together through a resistance whereby current through said brushes may develop an E. M. F. in said circuit opposed to the E. M. F. impressed on said circuit.

5. In a system of electrical distribution, a generator provided with a shunt field circuit, a rotatable ring, a distributed winding thereon, a commutator, connections between the sections of said winding and the sections of said commutator, a pair of brushes bearing on said commutator and connected in series in the circuit to be regulated, and means for connecting portions of said winding together through a resistance whereby current through said brushes will develop an E. M. F. across said brushes in a direction to oppose the initial flow of current in said circuit.

6. A system of electrical distribution comprising a variable speed generator provided with a shunt field, a ring of magnetic material rotatable with the armature of said generator, a winding on said ring, brushes for connecting said winding in series with the shunt field of the generator, and means for connecting portions of said winding together through a resistance whereby current through said brushes will set up a flux which, upon rotation of said winding, will develop an E. M. F. across said brushes in opposition to the impressed voltage on said shunt field circuit.

7. In a system of distribution, a variable speed generator provided with a shunt field, load circuits connected across the leads from said generator, and a C. E. M. F. device connected in series with said shunt field, said device being provided with means whereby current in said shunt field circuit may develop an E. M. F. in opposition to the voltage impressed on said shunt field circuit by said generator effective to weaken the current in said shunt field.

8. In a system of electrical distribution, a variable speed shunt-wound generator having a predetermined excitation characteristic, a C. E. M. F. device connected in series in the shunt field circuit of said generator, said device having a voltage characteristic varying inversely as said generator excitation characteristic, whereby said generator voltage may be held constant over wide ranges of speed.

9. In combination, a shunt wound generator and means for regulating the same, comprising a rotatable winding connected in series in the shunt field circuit, means for producing distortion of the flux due to said winding whereby to set up an E. M. F. opposing the E. M. F. impressed across said field circuit.

10. A system of electrical distribution comprising a variable speed generator provided with a shunt field circuit, and means connected to operate synchronously with said generator whereby current in said shunt field circuit is effective to develop an E. M. F. in said circuit opposed to the E. M. F. impressed on said circuit.

11. A system of electrical distribution comprising a variable speed generator provided with a shunt field circuit, a rotatable winding connected in series with said shunt field circuit, said rotatable winding being connected to rotate in synchronism with the generator rotor, and means for connecting portions of said winding together through a resistance whereby current in said shunt field circuit flowing through said winding may develop an E. M. F. opposed to the E. M. F. impressed by said generator on said shunt field circuit.

12. In a system of electrical distribution, a generator provided with a shunt field circuit, a rotatable winding connected to rotate in synchronism with the generator rotor, brushes connecting said rotatable winding in series in said field circuit, and means for connecting portions of said winding together through a resistance, whereby current through said brushes may develop an E. M. F. in said circuit opposed to the E. M. F. impressed on said circuit.

In witness whereof I have hereunto subscribed my name in the presence of two witnesses.

WILLIAM A. TURBAYNE.

Witnesses:
G. H. BURRELL,
A. H. WITMER.